(12) United States Patent
Hofman et al.

(10) Patent No.: US 11,230,401 B2
(45) Date of Patent: *Jan. 25, 2022

(54) BULK BAG DISCHARGE ASSEMBLY INCLUDING A CONDITIONING ASSEMBLY

(71) Applicant: Material Transfer & Storage, Inc., Allegan, MI (US)

(72) Inventors: Thomas J Hofman, Holland, MI (US); Scott L. Nyhof, Hamilton, MI (US)

(73) Assignee: Material Transfer & Storage, Inc., Allegan, MI (US)

( * ) Notice: Subject to any disclaimer, the term of this patent is extended or adjusted under 35 U.S.C. 154(b) by 992 days.

This patent is subject to a terminal disclaimer.

(21) Appl. No.: 15/207,466

(22) Filed: Jul. 11, 2016

(65) Prior Publication Data

US 2016/0340071 A1 Nov. 24, 2016

Related U.S. Application Data

(63) Continuation-in-part of application No. 13/586,377, filed on Aug. 15, 2012, now Pat. No. 9,387,950,
(Continued)

(51) Int. Cl.
*B65B 69/00* (2006.01)
*B65G 65/00* (2006.01)
(Continued)

(52) U.S. Cl.
CPC ...... *B65B 69/0083* (2013.01); *B01F 11/0065* (2013.01); *B30B 9/3082* (2013.01);
(Continued)

(58) Field of Classification Search
CPC ............ B65B 69/0091; B65B 69/0075; B65B 69/0083; B65B 1/24; B30B 7/04;
(Continued)

(56) References Cited

U.S. PATENT DOCUMENTS 2,858,051 A * 10/1958 Cunningham ...... B65B 69/0083
222/103
3,709,440 A * 1/1973 Kontz ..................... B02C 1/005
100/233

(Continued)

FOREIGN PATENT DOCUMENTS

GB 2514251 A * 11/2014 ............. B65D 61/00

*Primary Examiner* — Jimmy T Nguyen
(74) *Attorney, Agent, or Firm* — The Watson IP Group, PLC; Jovan N. Jovanovic

(57) ABSTRACT

A bulk bag discharge assembly comprising a main frame assembly and a bag conditioning assembly. The main frame assembly defines a bulk bag receiving region having a discharge support base structurally configured to receive a bulk bag thereon for discharging. The bag conditioning assembly comprises opposing conditioner frames, each having a proximal end, a distal end, and an impact face, and at a proximal end, pivotably coupled to the main frame assembly. A powered cylinder is pivotably coupled to the main frame assembly at a first end, and to the first conditioner frame at a second end. The conditioning assembly is structurally configured to impact a side of a bulk bag positioned on the discharge support base, without impacting a bottom of a bulk bag, wherein the distal end of the first conditioner frame is directed at least partially in an upward direction within the bulk bag receiving region.

15 Claims, 10 Drawing Sheets

Related U.S. Application Data which is a continuation-in-part of application No. 13/476,994, filed on May 21, 2012, now Pat. No. 8,567,312, which is a continuation of application No. 12/393,783, filed on Feb. 26, 2009, now Pat. No. 8,181,568.

(60) Provisional application No. 61/032,811, filed on Feb. 29, 2008.

(51) Int. Cl.
| | | |
|---|---|---|
| *B65B 1/24* | (2006.01) | |
| *B01F 11/00* | (2006.01) | |
| *B66C 1/22* | (2006.01) | |
| *B65D 88/66* | (2006.01) | |
| *B30B 9/30* | (2006.01) | |

(52) U.S. Cl.
CPC ............ *B65B 1/24* (2013.01); *B65B 69/0075* (2013.01); *B65B 69/0091* (2013.01); *B65D 88/66* (2013.01); *B65G 65/00* (2013.01); *B66C 1/226* (2013.01); *B65G 2201/0238* (2013.01)

(58) Field of Classification Search
CPC ... B30B 9/3082; B01F 11/0065; B65D 88/66; B66C 19/00; B66C 1/226; B65G 65/00; B65G 2201/0238
USPC ..... 100/122, 123, 233, 264, 269.01, 269.02, 100/270; 222/95, 103, 105, 181.2, 181.3, 222/203, 368; 294/68.1, 68.2, 68.3; 414/415

See application file for complete search history.

(56) References Cited

U.S. PATENT DOCUMENTS

| | | | | |
|---|---|---|---|---|
| 5,699,730 | A * | 12/1997 | Ogier | B65B 69/0091 100/233 |
| 5,788,449 | A * | 8/1998 | Riemersma | B65B 69/0091 222/103 |
| 6,138,443 | A * | 10/2000 | Taylor | B29C 47/0026 53/384.1 |
| 6,158,336 | A * | 12/2000 | Cambiano | B30B 9/3046 100/233 |
| 6,186,360 | B1 * | 2/2001 | Becker | B65B 69/0091 222/1 |
| 6,227,408 | B1 * | 5/2001 | Poulton | B65B 69/00 222/1 |
| 6,312,151 | B1 * | 11/2001 | Pendleton | B29C 47/1009 141/75 |
| 7,159,744 | B2 * | 1/2007 | Sterner | B65B 69/0083 222/196 |
| 7,223,058 | B2 * | 5/2007 | Nyhof | B65B 69/0091 414/415 |
| 8,181,568 | B1 * | 5/2012 | Hofman | B01F 11/0065 100/233 |
| 9,387,950 | B2 * | 7/2016 | Hofman | B65B 69/0091 |
| 2009/0010573 | A1 * | 1/2009 | Kosich | B65B 69/0091 383/22 |

\* cited by examiner

BULK BAG DISCHARGE ASSEMBLY INCLUDING A CONDITIONING ASSEMBLY

CROSS-REFERENCE TO RELATED APPLICATION

This application is a continuation in part of U.S. patent application Ser. No. 13/586,377 filed Aug. 15, 2012, which is continuation in part of U.S. patent application Ser. No. 13/476,994 filed May 21, 2012, which is a continuation of U.S. patent application Ser. No. 12/393,783 filed Feb. 26, 2009, entitled Bulk Bag Conditioning System, issued as U.S. Pat. No. 8,181,568 which claims priority from U.S. Prov. Pat. App. Ser. No. 61/032,811 filed Feb. 29, 2008 entitled Bulk Bag Conditioning System, the entire disclosure of each of the foregoing is incorporated by reference herein in their entirety.

BACKGROUND OF THE DISCLOSURE

1. Field of the Disclosure

The disclosure relates in general to bulk bag handling equipment, and more particularly, to a bulk bag discharge assembly that includes a conditioning assembly, with the conditioning assembly conditioning the contents of the bag in preparation for discharge.

2. Background Art

Bulk bag discharging systems have been used to transfer materials, usually raw materials, from one container into another without contaminating the materials. Generally, bulk bag discharging systems lift a material-containing bag into a dispensing position. Subsequently, the bag may be optionally coupled to outside structures on the frame of the discharge system, and emptied.

On occasion, there are products (i.e., contents) that are not readily dischargeable. For example, salt that is transported in a wet or humid environments may become hardened and extremely difficult to discharge from a bulk bag. The salt crystals bond to each other such that sizeable force is required to break apart or re-granulate the salt (i.e., condition the contents).

In such an instance it is advantageous to provide conditioning systems which apply forces to the outside of the bulk bag to condition the contents for discharge. Problematically, many of the conditioners that have been utilized have linear actuators that are fixedly mounted at a first end and a second end, such that the conditioners likewise travel in a linear path. As the bulk bag has uneven surfaces and great surface variations both in a single bulk bag and as between bulk bags, the actuators are often subjected to unbalanced loads and bending moments. Such bending moments can cause damage and premature failure of the actuators.

Certain solutions have been provided which overcome these deficiencies and provide for conditioning arms that swing in a pivoting manner. Generally, such swinging arms pivot about an axis and condition the bag prior to entry into the discharge assembly. It would be advantageous to provide for improved conditioning of a bulk bag that is hanging within a discharge assembly.

SUMMARY OF THE DISCLOSURE

The disclosure is directed to a bulk bag discharge assembly comprising a main frame assembly and a bag conditioning assembly. The main frame assembly has a first end and a second end. The main frame assembly defining a bulk bag receiving region confined thereby, which bulk bag receiving region has a lower end thereof defined by a discharge support base structurally configured to receive a bulk bag thereon for discharging. The bag conditioning assembly comprises opposing conditioner frames. Each conditioner frame has a proximal end, a distal end, and an impact face. The proximal end is pivotably coupled to the main frame assembly, with the distal end extending therefrom. The impact face is spaced apart from the proximal end. A powered cylinder is pivotably coupled to the main frame assembly at a first end, and to the first conditioner frame at a second end, spaced apart from the proximal end thereof. The conditioner frames are structurally configured to impact a side of a bulk bag positioned on the discharge support base, without impacting a bottom of a bulk bag. Additionally, the distal end of the first conditioner frame is directed at least partially in an upward direction, through a majority of the travel within the bulk bag receiving region.

In come configurations, each of the conditioner frames are coupled to the main frame assembly above a path of the impact face.

In some configurations, the opposing conditioner frames are substantial mirror images of each other.

In some configurations, at least one of the conditioner frames further comprises a pair of opposing side frames, a lower cross beam and an upper cross beam. The pair of opposing side frames are positioned in a spaced apart and generally parallel configuration. Each of the side frames are pivotably coupled to the main frame assembly about a proximal end thereof. The lower cross beam extends between the pair of opposing side frames at a distal end thereof. The upper cross beam extends between the pair of opposing side frames between the proximal end and the distal end thereof, spaced apart from each of the proximal and distal ends thereof.

In some configurations, the upper cross beam and the lower cross beam are substantially parallel to each other.

In some configurations, the upper cross beam is coupled to the pair of opposing side frames inward of a line defined by the pivotable coupling at the proximal end, and the lower cross beam at the distal end.

In some configurations, the at least one of the conditioner frames further comprises a plurality of connector supports coupled to each of the upper cross beam and the lower cross beam in a space apart orientation between the opposing side frames.

In some configurations, the connector supports are substantially perpendicular to each of the upper cross beam and the lower cross beam.

In some configurations, each of the connector supports each comprise a substantially diamond shaped cross-sectional configuration, defining a vertex and opposing side wings extending therefrom, which form a portion of the impact face thereof.

In some configurations, the assembly further includes a massaging frame assembly that includes a pair of opposing massaging frames. Each frame has a proximal end and a distal end, and defines an impact face. The opposing frames are pivotably coupled to the discharge support base on opposing sides of a discharge opening. The massaging frames are structurally configured to direct the impact face against a bottom of a bulk bag on either side of the discharge opening.

In some configurations, the pair of opposing massaging frames are substantially perpendicular to the pair of opposing conditioners so that a pivot axis of each of the pair of opposing massaging frames is perpendicular to the pivot axis of each of the pair of opposing conditioners.

In some configurations, the opposing massaging frames and the opposing conditioners impact the bag in different planes.

In some configurations, the main frame assembly further comprises an upper structure and a lower structure. The bulk bag receiving structure is positioned in the lower structure, with the upper structure extending upwardly from the lower structure.

In some configurations, the upper structure further includes a hoist member coupled to a beam that from the upper structure in a generally horizontal configuration.

In some configurations, the upper structure has a foot print that is smaller than a foot print of a lower structure.

BRIEF DESCRIPTION OF THE DRAWINGS

The disclosure will now be described with reference to the drawings wherein.

DETAILED DESCRIPTION OF THE DISCLOSURE

Figure 1:
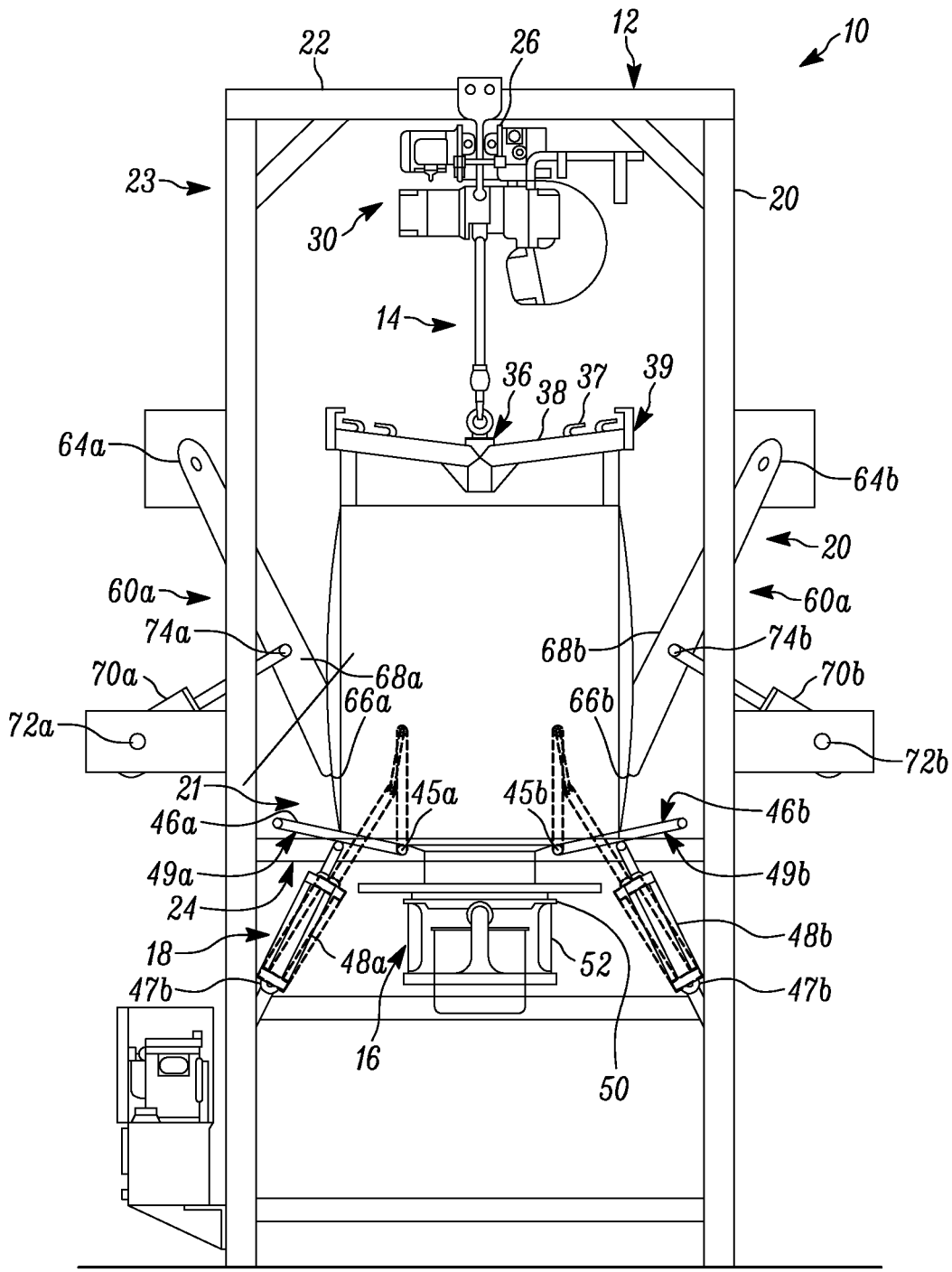
FIG. 1 is a side view of the discharge and hoist assembly, showing a side view of bag conditioning assembly of an embodiment of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
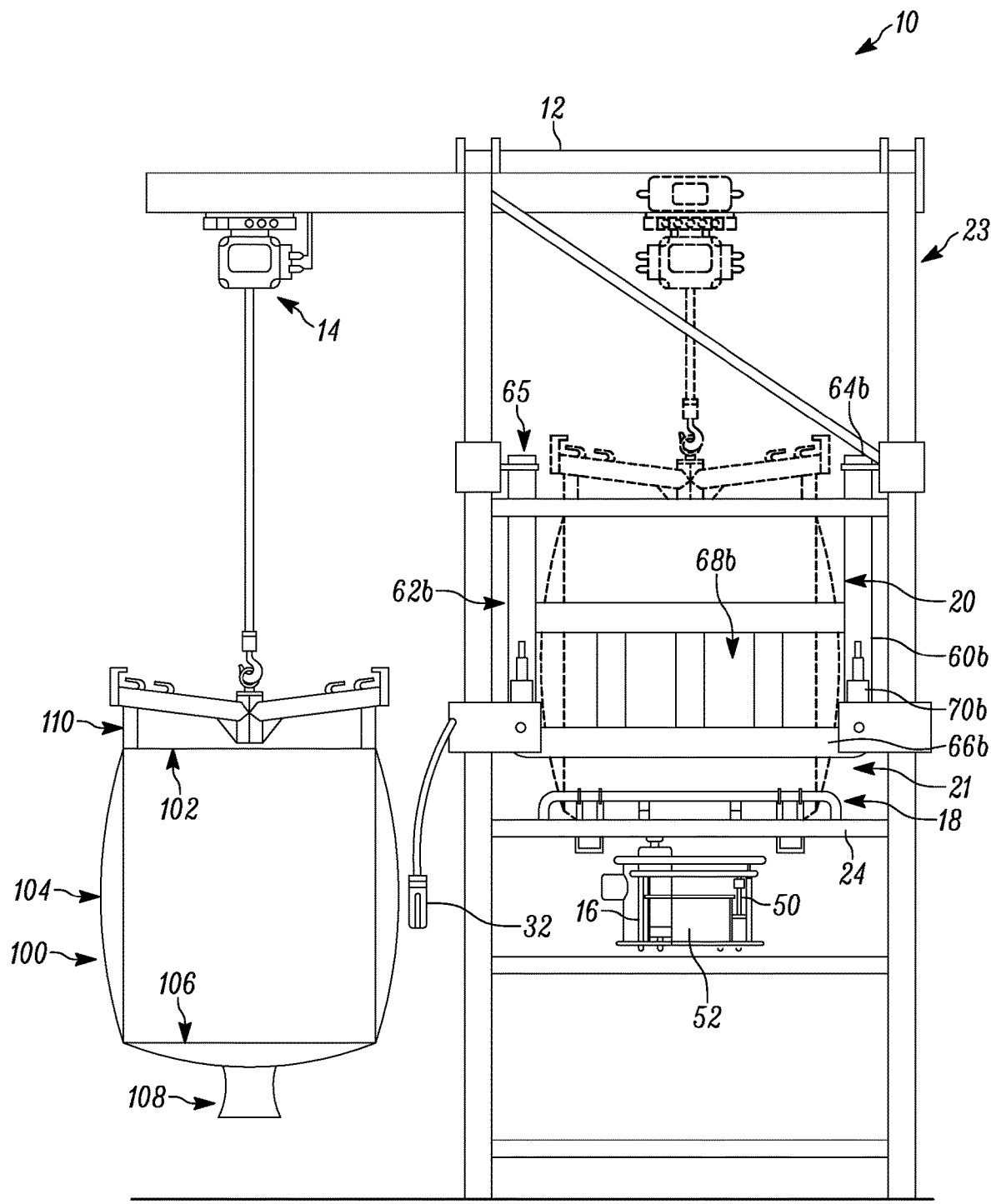
FIG. 2 is a side view of the discharge and hoist assembly showing a front view of the bag conditioning assembly of an embodiment of the present disclosure.

Referring now to the drawings and in particular to FIGS. 1 and 2, bulk bag discharge and conditioning assembly 10 is shown in FIG. 1 as comprising main frame assembly 12, hoist assembly 14, discharge assembly 16, massaging frame assembly 18, and bag conditioning assembly 20. One exemplary discharge assembly, without the bag conditioning assembly of the present disclosure is disclosed in U.S. Pat. No. 7,233,058 issued to Nyhof, the entire disclosure of which is hereby incorporated in its entirety by reference herein.

The main frame assembly 12 comprises perimeter pieces 20, cross support members 22, discharge base 24 and hoist support 26. The main frame assembly extends from base region 21 to upper end 23. The perimeter pieces 20 typically comprises about three inch to about four inch diameter square tubing having about ¼ inch to about ⅝ inch thick walls, while other materials are contemplated. The perimeter pieces 20 are typically continuously welded with one another to provide added strength. The cross support members 22 are typically about 1½ by 1½ by about 1½ inch square metal segments. The cross support members 22 are typically continuously welded to the other portions of the main frame assembly 12 to provide optimum strength. While not preferred, the cross support members 34 may be anchored to the structural members by any other suitable means, such as bolts and angle irons.

The discharge support base 24 is positioned between the base region 21 and the upper end 23. As will be explained, the discharge support base 24 forms the base upon which the discharge assembly is positioned, and in the embodiment shown, is much like the cross support members 22. There is no particular orientation and position for the discharge support base, however, in many embodiments, the discharges support base is spaced apart from the base region so that the discharge assembly is spaced from the ground or other outside surface for ease of accessibility.

The discharge support base 24, along with the perimeter pieces serves to define the receiving region of the bag and the footprint area of the bag. The receiving region of the bag extends from the hoist to the discharge support base 24 (as the bag can be raised, lowered and rotated within the footprint area). Generally, the operational portion of the bag is limited to the footprint area within the receiving region.

The hoist support 26 is shown the embodiment as comprising an I-beam engaged to the top of the main frame assembly 12. The I-beam is typically about an eight inch S-flange, approximately twenty-three pound beam that conforms to ASTM A36 carbon steel specifications. The hoist I-beam is typically engaged to the main frame assembly 12 with an about one inch thick plasma cut mounting support bracket. Of course, a number of different materials and configurations are likewise contemplated, and the hoist support is not limited to such a structure. Other hoist supports, such as tubing, and the like, is also contemplated.

The hoist assembly comprises hoist 30 and material transport subassembly 34. The hoist 30 is typically a heavy-duty hoist capable of lifting loads from about 1 ton to about 3 tons, although other capacities are likewise contemplated. Typically, the hoist is controlled with a conventional controller 32. The hoist 30 is operably coupled with a heavy-duty chain, cable, or other lifting member, which may include a steel hook at an end thereof. The steel hook is typically mounted to the chain such that it is allowed to rotate without binding the chain, usually utilizing a bearing in a ball and socket type arrangement. Of course, a number of different configurations are contemplated for use in association with the hoist.

Optionally, a forklift may be used in conjunction with a bag-hanging frame, which engages the bag 24. The bag suspends from the bag hanging fame and is moved into position with the forklift. The bag-hanging frame engages the main frame assembly. The bag-hanging frame typically engages the top of the main frame assembly and sets upon the four corners of the assembly. There are typically stacking pads on the top four corners of the main frame assembly that position the bag and the bag hanging assembly in the proper discharging position.

In other embodiments, a hoist system may be separate from the bulk bag discharge assembly. For example, crane of sorts which is free standing, or coupled to the building structure can be utilized in place of a hoist assembly. In other embodiments, a simple pulley system suspended from a beam of the surrounding structure can be utilized. Indeed, there is no limit as to how a user can place or suspend a bulk bag within the bulk bag receiving region.

With reference to FIGS. 1 ad 2, the material transport subassembly 18 is coupled to the hoist 30 by coupling to the cable or other structure of the hoist 30. The material container transport assembly 34 typically includes a central hub portion 36, four material container support members, such as support member 38 engaged to the central hub portion via weld, extending at an upward angle of from about three degrees to about seven degrees, but, most typically about five degrees. The support members 38 typically are spaced at about 90 degree angles from one another. Each of the material container support members 438 also typically include at least one outwardly extending bag loop retention member, which are typically L-shaped bent steel rods engaged to the support members via a weld or a nut and bolt type arrangement. In the preferred embodiment, there are three L-shaped outwardly extending bag loop support retention members 37 on each material container support member 38 to allow the transport assembly to easily accommodate material bags of various sizes.

Additionally, each material container support members 38 typically include an inwardly extending L-shaped bag loop retention member 39 engaged at or near the non-hub engaging end of the material container support members 38. These L-shaped inwardly extending bag retention members, while not necessary, assist in preventing the loops of the bag/container from falling off the ends of the material container support members when the bag is placed on the ground for removal from the material container transport assembly. Without the L-shaped inwardly extending bag loop retention members, the bag loops could unintentionally disengage from the material container support members of the transport assembly when the bag container is no longer held in position by gravity. The inwardly extending L-shaped bag loop retention members may be of any suitable height, but typically extend slightly higher than the outwardly extending bag loop retention members. Moreover, the inwardly extending L-shaped bag loop retention members are typically substantially flat bent members, while the outwardly extending bag loop retention members may be any suitable shape, but are typically cylindrical in shape.

It will be understood that in other embodiments, a different material transport subassembly 34 may be employed. For example, a single chain that is extended through each loop of the bag may be employed, or a pair of chains, each of which extends through two loops and which is joined together is likewise contemplated. The disclosure is not limited to any particular material transport subassembly, and, any one of a number of different subassemblies can be utilized, as long as they can adequately support a bag that is filled.

The discharge assembly 16 is shown in FIGS. 1 and 2 as comprising opening 50 and discharge mechanism 52. It will be understood that opening 50 is configured to be coupled to a discharge spout of a bag, to facilitate discharge through the discharge mechanism 52. It will be understood that in certain embodiments, the particular structure disclosed in the '058 patent may be employed. In other embodiments, another type of discharge mechanism can be employed. In still other embodiments, a discharge mechanism 52 may be omitted, and, instead, the discharge opening may merely be positioned near the discharge support base. In still other embodiments, a discharge assembly 16 may be omitted, and, the discharge and hoist assembly may be utilized solely for conditioning the contents of the bag for eventual discharge on the same assembly or a different assembly. There is no requirement that the bag be discharged on the assembly (or that the bag be conditioned on the assembly).

The massaging frame assembly 18 is shown in FIG. 1 as comprising massaging frames 40a, 40b. It will be understood that each of the massaging frames may be substantially identical in configuration. As such, massaging frame 40a will be described with the understanding that the other massaging frame 40b is substantially identical. Massaging frame 40a includes proximal end 42a, distal end 44a, impact face 46a and pneumatic mechanism 48a. The massaging frame 40a is coupled to the main frame assembly 12 about pivot 45a. The pivot 45a substantially coincides with the proximal end 42a of the massage frame assembly 12. Additionally, the pivot 45a is positioned proximate the discharge support base 24, near the discharge assembly 16. Typically, when actuated, the impact face 46a contacts the lower portion of a bag that is positioned to discharge through opening 50 (which is generally the bottom two feet of the bag.

The massager frame typically comprises a steel tubing which is pneumatically driven by the pneumatic mechanism 48a. The rounded configuration of steel tubing allows the assembly to be easily washed down when required. The pneumatic mechanism 48a that moves the massagers each independently provides a force of up to 1000 pounds on each side of the bag. Additionally, the pneumatic mechanism may be programmed or controlled so as to adjust both force and frequency. The force is adjusted by setting the pressure regulator to the desired setting and the frequency is adjusted by setting an adjustable timer. Each massager frame can be set to stroke into the bag in alternating fashion. The massager on the right will stroke in, then, as it retracts, the massager on the left will stroke in and vise versa. Alternatively, the massagers can be set to stroke in and out simultaneously. As will be explained, the massagers are configured to urge an already conditioned product (or a product that does not require conditioning) toward the discharge. It will be understood that certain products may form a breach or otherwise bind near the discharge, and the massagers assist with the loosening of these products for eventual discharge through the discharge opening.

The bag conditioning assembly 20 is shown in FIGS. 1 and 2 as comprising opposing bag conditioners 60a, 60b. The opposing bag conditioner 60a will be described in detail with the understanding that the opposing bag conditioner 60b is substantially identical thereto. The opposing bag conditioner 60a comprises conditioner frame 62a having proximal end 64a, distal end 66a and impact face 68a. The conditioner frame 62a is pivotally coupled to the main frame assembly 12 about pivot 65a. In the embodiment shown, the pivot 65a is positioned near the upper end 23 of the main frame assembly, well above the discharge support base. The distal end 64a extends downwardly toward the discharge support base.

The powered cylinder 70a include first end 72a which is pivotally coupled to the main frame assembly spaced apart from pivot 65a. The second end 74a of the powered cylinder 70a is pivotably coupled to the conditioner frame. In certain embodiments a single powered cylinder can be utilized, whereas in other embodiments, multiple powered cylinders can be employed. The powered cylinder is preferably a hydraulic cylinder or an air cylinder can apply a force of between 10,000-70,000 pounds. This force is significantly larger than the force that can be exerted by the massage frames 40a, 40b. Of course, a number of different cylinders or power devices are contemplated that can provide sufficient force to condition a bulk bag.

It will be understood that the conditioner frames and the powered cylinders are, in the embodiment shown, pivotably coupled to the frame assembly through a fixed pivot axis. It will be understood that the pivot axis can be translated up and down along the frame assembly so that the conditioner arms can be moved up or down (instead of moving the bulk bag, or in addition to moving the bulk bag). Such a configuration is shown schematically at FIG. 3(a), although it is contemplated that the geometry shown in FIG. 3(a) could also be fixed.

The particular configuration of the conditioner frame 62a can be similar to that which is disclosed in U.S. Pat. No. 8,181,568 issued to Hofman, et al, the entire disclosure of which is incorporated by reference in its entirety. In that application particular frame structures and reinforcements is disclosed, along with particular configurations of powered cylinders relative to the conditioner frame. Of course, in other embodiments, different configurations of the conditioner frame and powered cylinders is contemplated.

Problematically, and as is addressed in the '568 patent, it is advantageous to have the powered cylinders pivotably coupled to the main frame assembly 12 and also to the conditioner frame, which itself is pivotably coupled to the main frame assembly 12. In particular, such a configuration allows for the powered cylinders to have virtually no forces that are not along the axis of the piston and cylinder mechanism. It is the bending moments that eventually cause wear and failure to powered cylinders. By minimizing such bending moments through pivotal coupling, performance of the powered cylinders is enhanced.

In the present embodiment, however, there is an additional concern with the application of force to the bag. In particular, the bag in the present disclosure is, in certain embodiments, suspended from the hoist assembly 14. As such, when conditioned, the suspended bag experiences forces that must be handled by the straps that are coupling the bag to the material transport subassembly. Advantageously, the position of the pivot and the impact face is such that the impact face is being directed in an upward direction when impacting and treating the bag, through a majority of the receiving region of the bulk bag. As such, there is virtually no additional pulling or downward force exerted on the bag and the straps of the bag. Thus, damage to the bag is minimized. It is possible that, due to the position of the bag and inadvertent movement of the bag, a portion of the contact and travel of the conditioner frame can impose downward forces upon the bag, however, these are typically minimized, and, predominantly, upward forces are imparted by the conditioning frames.

One configuration which results in an application of an upward force occurs in the embodiment shown, wherein the pivot is positioned near or at the upper end 23 of the main frame assembly (i.e., above the area to be conditioned) and sufficiently laterally away from the space occupied by the bag (or the space immediately above the bag) so that the equilibrium position (wherein the force exerted by the pivots is in neither an upward or a downward direction) is spaced apart from the bag. In turn, by the time that the impact face contacts the bag, the force has an upward and an inward component.

Figure 3B:
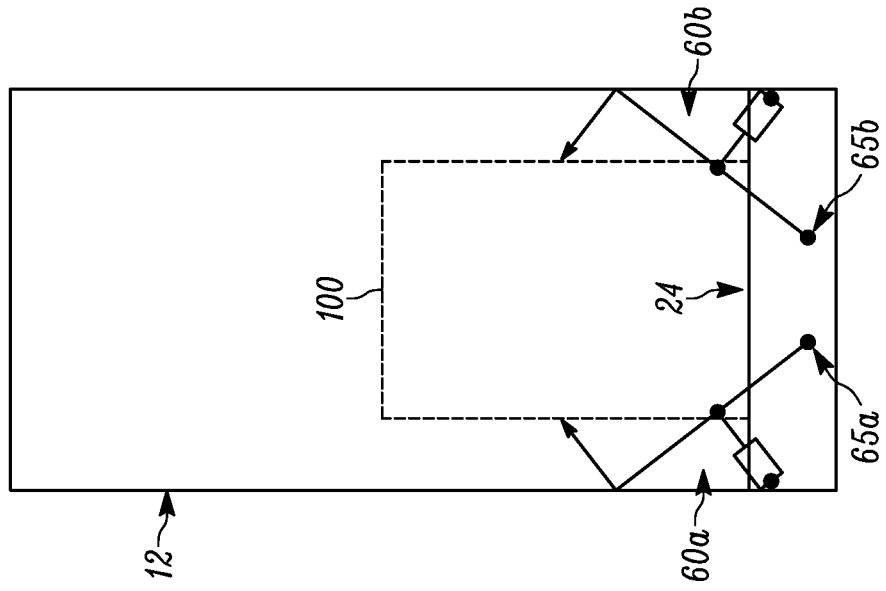
FIGS. 3(a) through 3(d) are schematic representations of various positioning of the components of the bag conditioning assembly of the present disclosure.
Figure 3A:
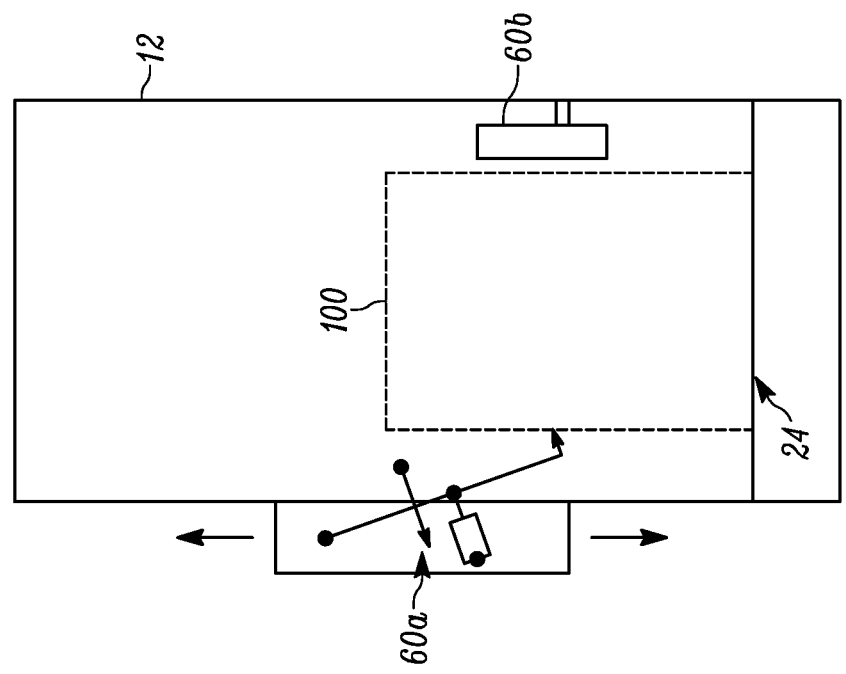

In another configuration, shown schematically in FIG. 3b, the pivot 65a, 65b may be positioned below the upper end of the bag. In such a configuration, the pivot 65a, 65b is positioned so as to be within the confines of the bag so that contact with the bag is reached prior to the equilibrium position such that the force exerted by the impact face has an upward component as well as an inward component. Other configurations are shown in FIGS. 3a, c and d which also show different configurations wherein the impact face contacts the bag with an upward and an inward force through a majority of the movement of the conditioner frames while in contact with the bulk bag. In each such embodiment, the same is achieved although the pivot 65a, 65b is positioned at a different location. It will also be understood that multiple pivots may be employed with more complicated linkages, with the understanding that the force applied against the bag is in an inward and upward direction.

Figure 3D:
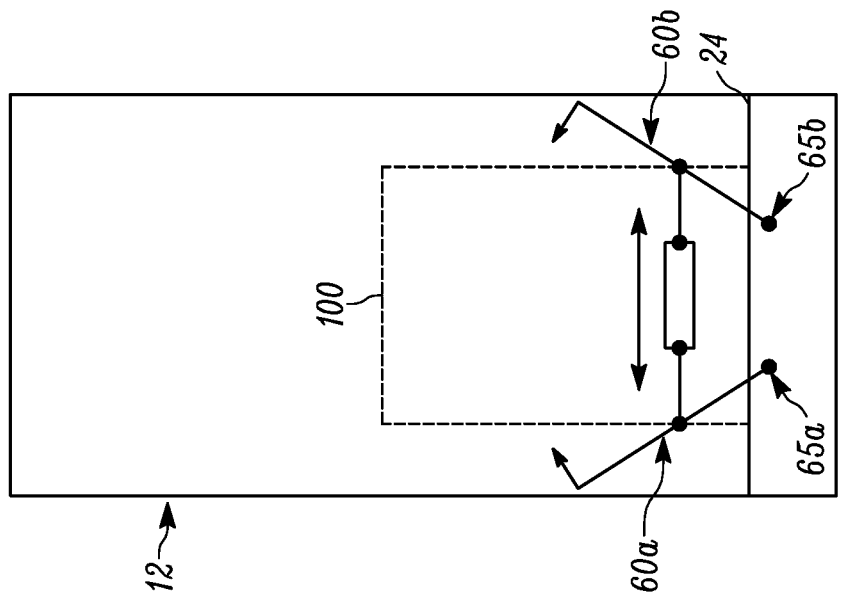
Figure 3C:
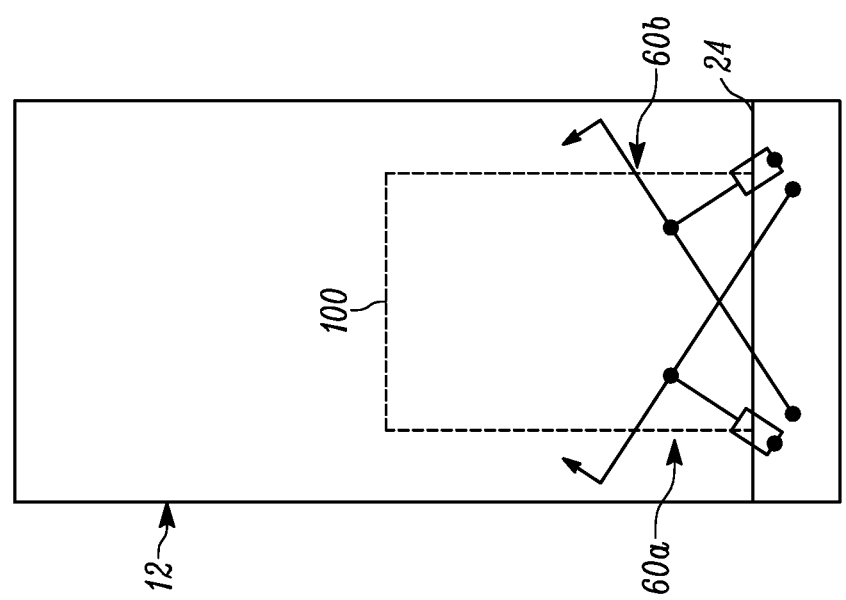
Figure 4:
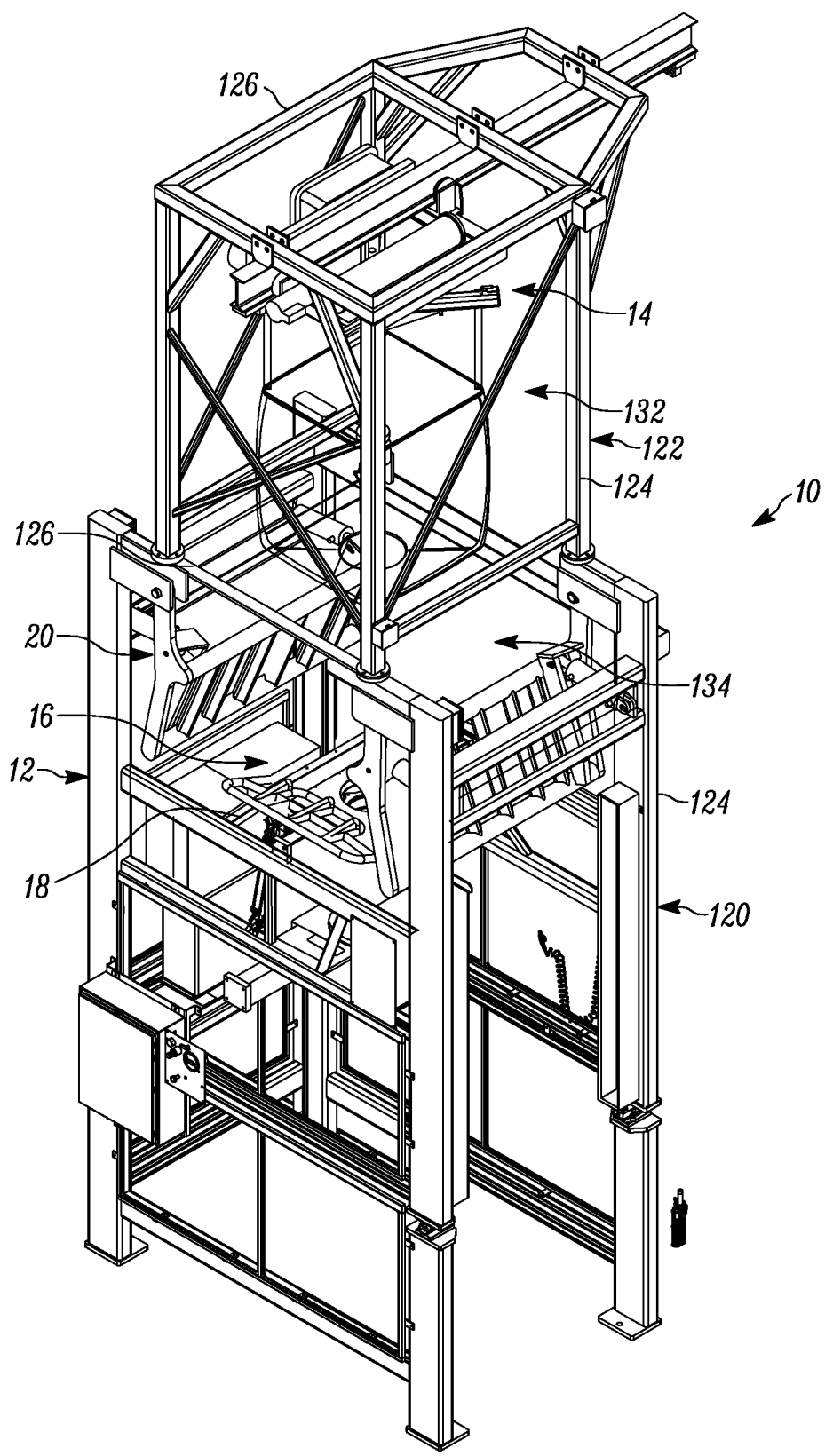
FIG. 4 of the drawings is a perspective view of the assembly of the present disclosure.
Figure 5:
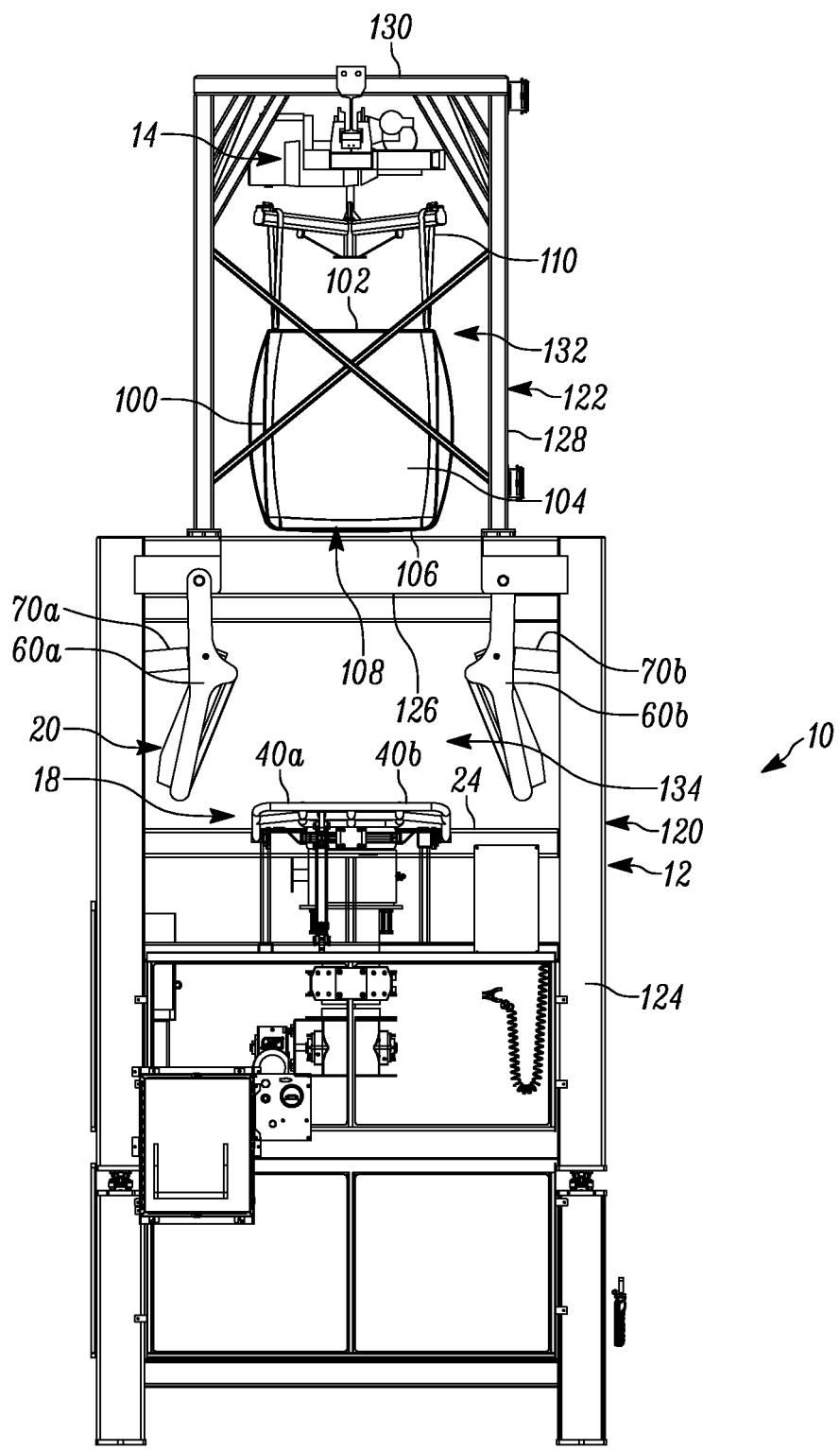
FIG. 5 of the drawings is a front elevational view of the assembly of the present disclosure.
Figure 6:
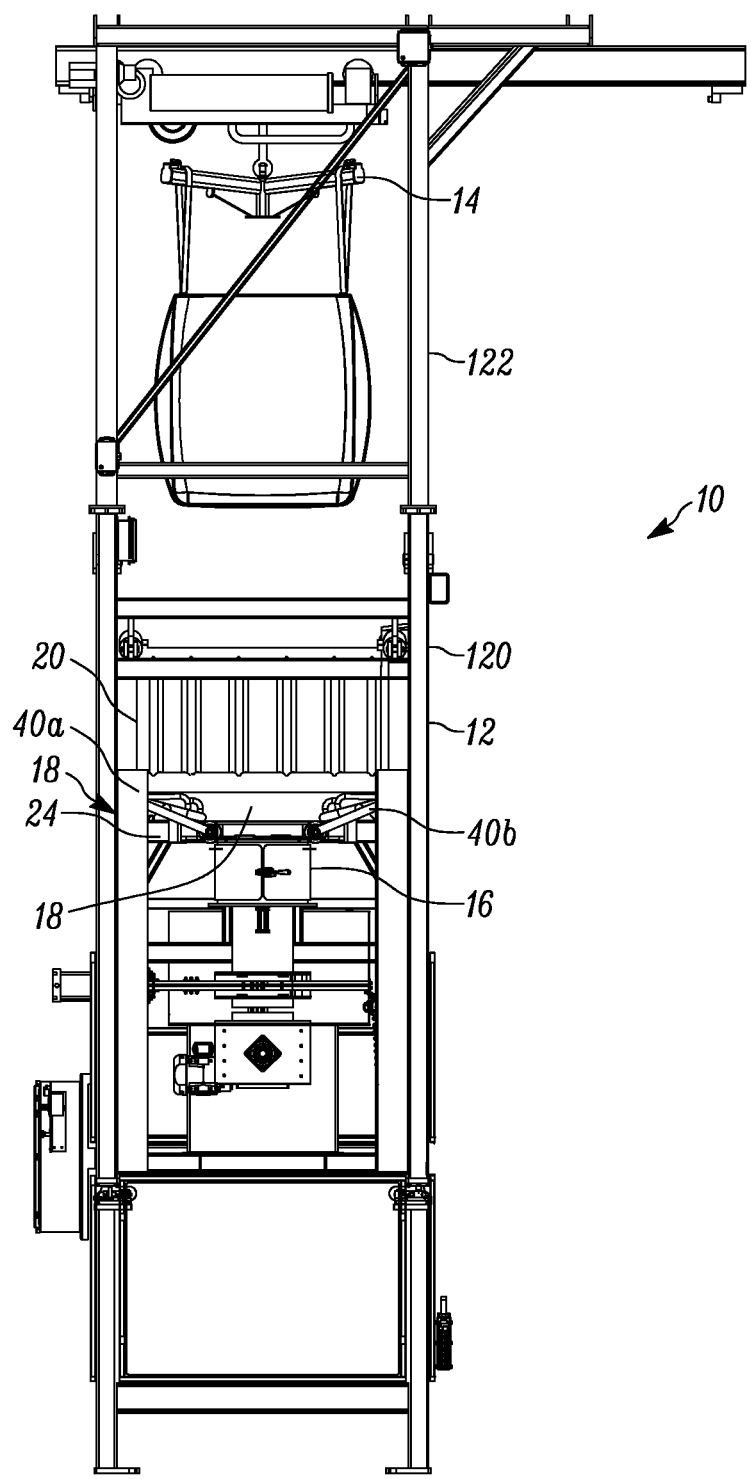
FIG. 6 of the drawings is a side elevational view of the assembly of the present disclosure.
Figure 7:
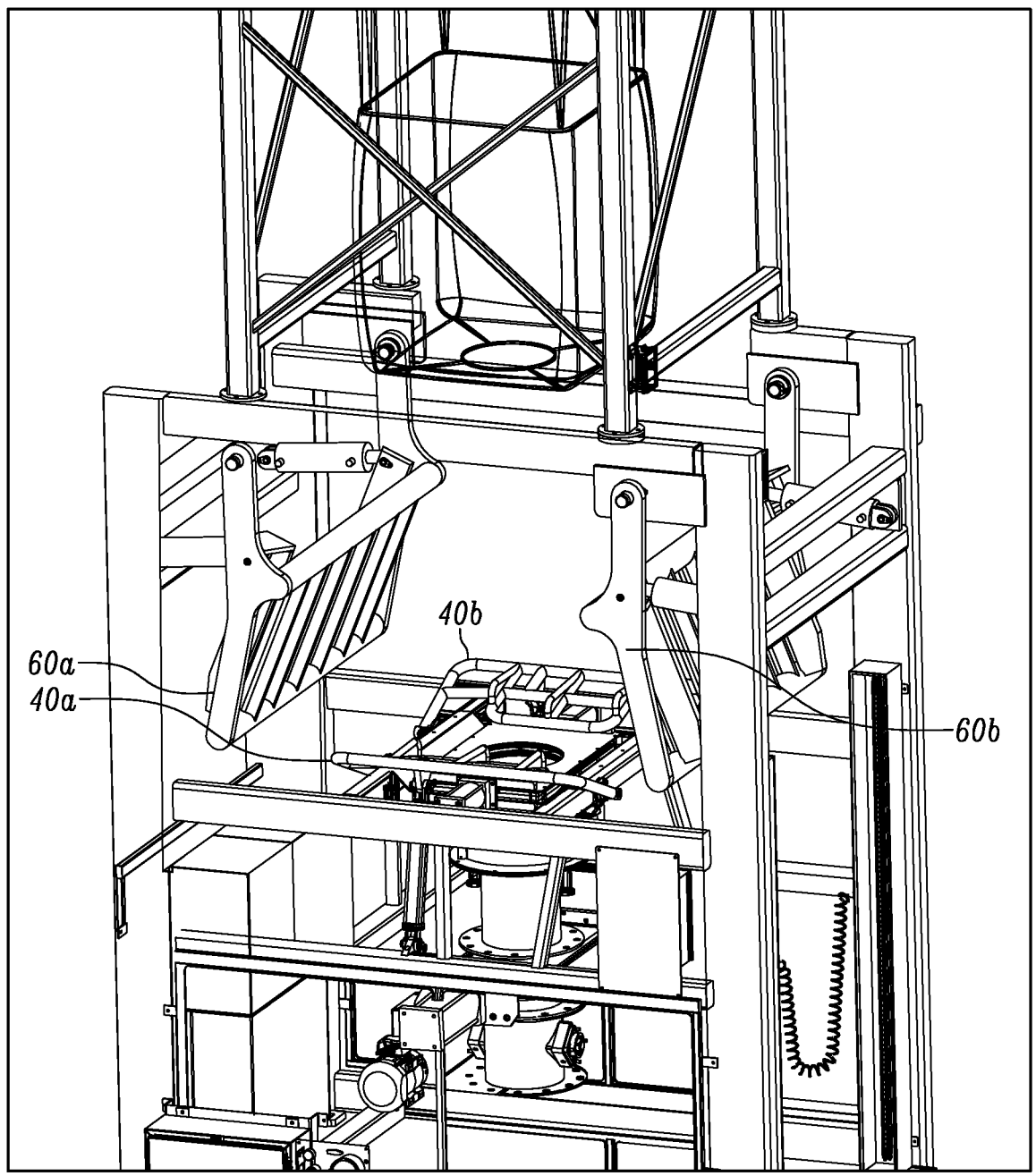
FIG. 7 of the drawings is a partial perspective view of the assembly of the present disclosure, showing, in particular, the massaging frame assembly and the bag conditioning assembly.
Figure 8:
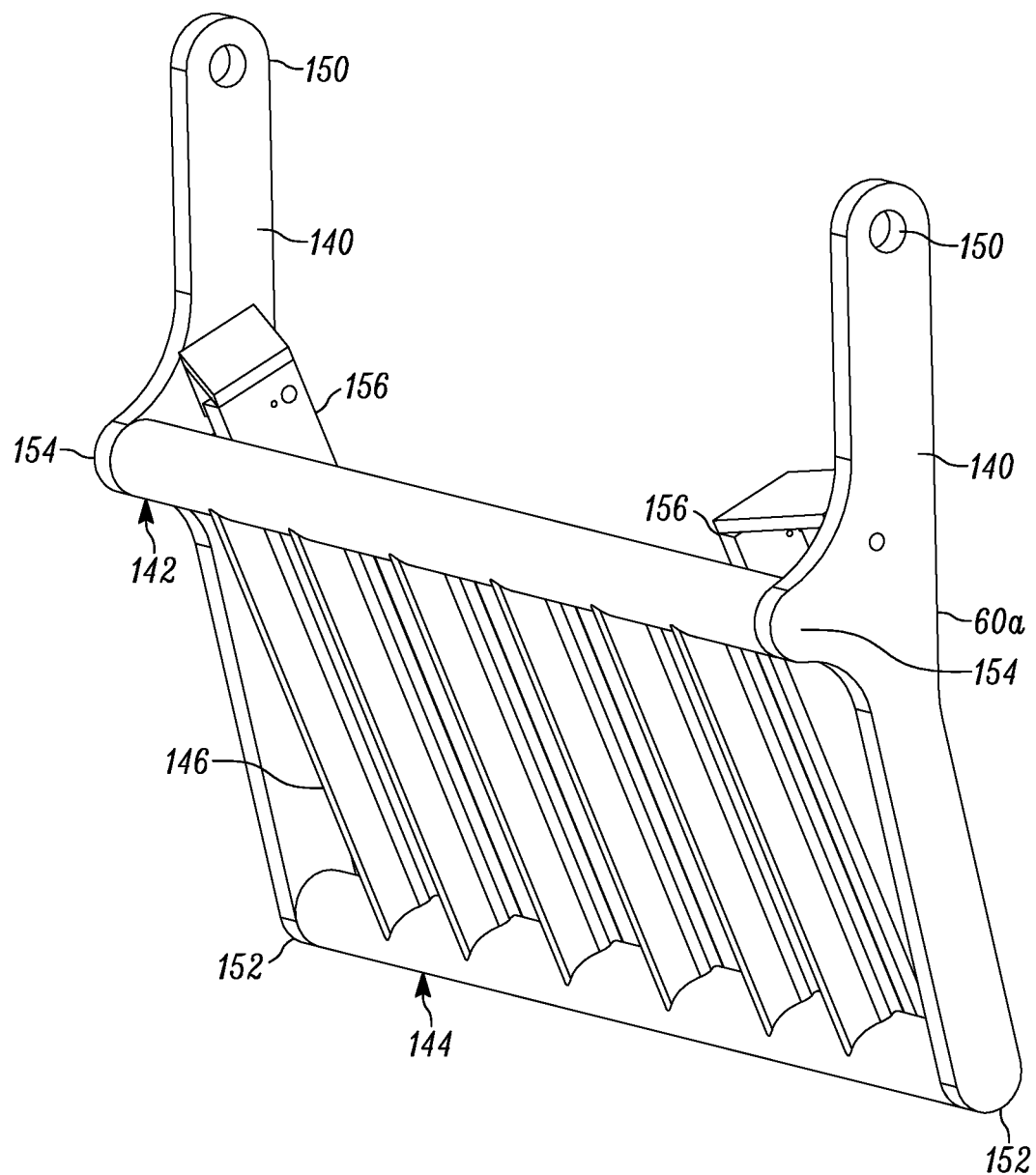
FIG. 8 of the drawings is a perspective view of a conditioner frame of the assembly of the present disclosure.
Figure 9:
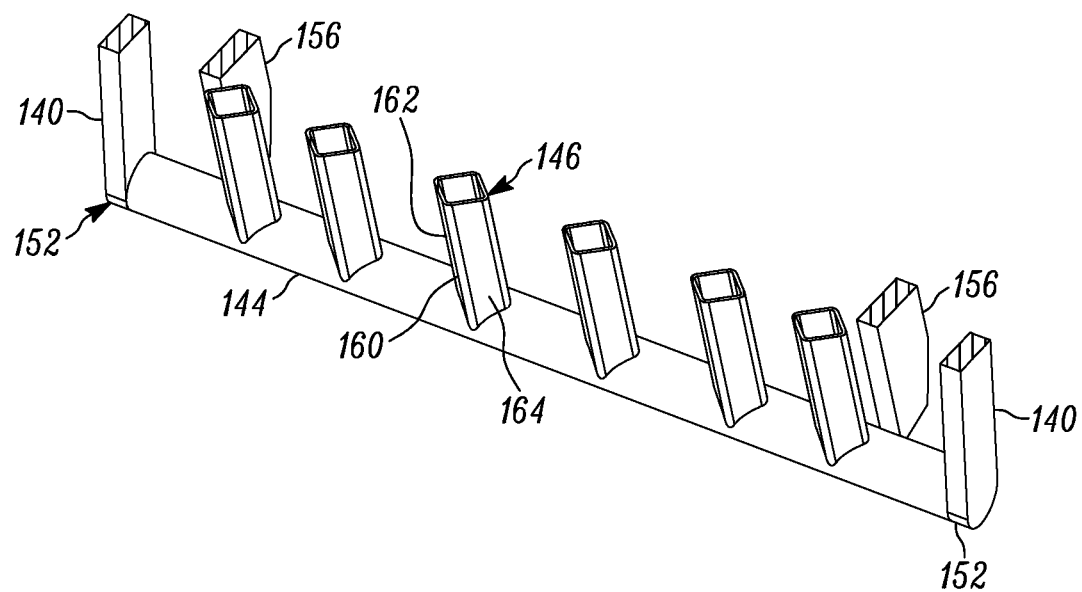
FIG. 9 of the drawings is a cross-sectional perspective view of the conditioner frame of the assembly of the present disclosure.

The configuration of FIG. 3d discloses a first and second conditioner arm, pivotally coupled to opposing sides of the frame, with a powered cylinder pivotally coupled to each of the first and second conditioner arms between the first and second ends. In such a configuration, the powered cylinder provides opposing forces such that the first and second conditioner arms work against each other. The same principle can be used with different geometries, wherein the conditioner arms are positioned in alternate locations, with the powered cylinder extending between the two cylinders (i.e., in conjunction with the conditioner frame geometries of FIGS. 3b and 3c, among others).

In operation, and with reference to FIG. 2 initially, and FIG. 1, subsequently, the user first couples a bag to the discharge and hoist assembly. The bag 100 includes top surface 102, bottom surface 106 and sides, such as side 104 spanning therebetween. A discharge opening 108 extends through the bottom surface 106, and a plurality of loops 110 extend from the bag above the top surface 102. In many embodiments, a total of four loops 110 are employed and extend from each corner of a generally cubic configuration of bag 100.

Generally, the bag comprises an outer woven bag and includes an inner liner which shape matingly engages the outer woven bag, the combination of which is commonly referred to as a bulk bag. Such bags may be filled with any number of dry goods, such as granular material, pastes, and the like. The bags may be cubic in configuration and may exceed 9-12 cubic feet with a capacity of in excess of 2000 pounds. The disclosure is not limited to any particular bag configuration, nor is the disclosure limited to any particular material that is contained within the bag. One such bulk bag is shown in U.S. Pat. No. 4,781,472 issued to LaFleur, the disclosure of which is hereby incorporated by reference.

Once the bag is coupled to the material transport subassembly 34, the user operates the hoist and positions the bag within the bag receiving region of the main frame assembly. Once positioned, the bag can be lowered or raised as needed so that the bottom surface 106 of the bag abuts the discharge support base 24, or is spaced apart therefrom.

In the embodiment that is specifically contemplated, for exemplary purposes, the product that is contained within the bag comprises a salt which has been transported in a wet or humid environment and has hardened such that even when the discharge opening 108 is opened, the salt is not easily expelled from within the bag. In such an exemplary situation, it is necessary to apply the bag conditioning assembly so that the product can be conditioned so that it can be readily discharged. The same is true of other materials which, through the presence of moisture and the like harden and are no longer easily separable into smaller granular and flowable components.

To effectuate conditioning, the first and second conditioners are activated. The activation of the conditioners is such that the powered cylinder(s) actuate and initiate rotation of the conditioner frames about pivot 65. Inasmuch as each of the powered cylinders are pivotably mounted, the force is applied along the longitudinal axis of the cylinders, minimizing any undesirable bending moments which can damage the cylinders. Continued rotation of the conditioner frames eventually directs the impact faces into contact with the bag powered by the force of the powered cylinders.

Due to the position of the pivot and the configuration of the conditioner, the impact face 68 of the conditioner frame contacts the bag in an inward and upward direction, (or shortly after contact with the bag) thereby conditioning (i.e., breaking up) the product, while being mindful of the forces exerted onto the hanging loops 110. In fact, in many instances, the conditioner arms actually reduce the force that is exerted on the hanging loops 110, at the time of contact, or very shortly thereafter.

The conditioners 62a, 62b may operate independently or in unison to act against the bag. In certain embodiments, it will be understood that one of the conditioners may be replaced with a stationary structure, such that only one conditioner is present, and is opposed by a stationary structure. It will also be understood that the bag may be manipulated by the hoist to raise or to lower as needed to effectuate treatment of different portions of the bag. For example, the hoist assembly and the bag conditioning assembly may be preprogrammed to have a specific treatment regimen which involves repeated movement of the conditioners as well as movement of the bag by way of the hoist assembly. In another embodiment, wherein configured, the conditioner frames can be translated relative to the frame so that the axis of pivoting is translated up or down relative to the conditioner frames and, in turn, the bulk bag.

Once the bag is conditioned as needed, the bag can be prepared for discharge. Where the bag is to be discharged on the same equipment, the bag is preferably positioned in close proximity to the discharge support base, and the discharge opening 108 is coupled to the discharge assembly. Finally, the discharge opening 108 is opened and the product is discharged through discharge mechanism 52. Advantageously, to urge the conditioned product toward and into the discharge opening 108, the massaging frame assembly 18 is activated wherein the massager frames 40a, 40b are directed to pivot about their respective pivots so that they contact and incline the bottom surface 106 of the bag toward and on opposing sides of the discharge opening. This further creates a funnel type of configuration that directs product toward and into the discharge opening.

When emptied, the bag can be removed from the discharge and hoist assembly and a subsequent bag can be introduced. It will be understood that not every bag that is positioned within the receiving region of the main frame assembly will require the use of the conditioning assembly 20. It will also be understood that in certain applications, the use of the massaging frame assembly can be omitted. It will further be understood that the bag conditioning assembly can be utilized without requiring discharge of the contents.

In another configuration, the main frame 12 further includes lower structure 120 and upper structure 122. The foot print of the upper structure and the lower structure are different in that the footprint of the upper structure is smaller than the lower structure. The lower structure 120 includes upright cage 124 and upper cross support 126, to, in turn, form a substantially rectangular cubic configuration. The lower structure defines a massage, condition and discharge region 134.

The upper structure 122 includes upright cage 128 and cross members 130. The structure defines the hoist region and the handling region 132 that extends above the massage, condition and discharge region. Advantageously, the footprint of the structure is reduced, as the upper structure extends from the upper cross supports 126. As such, the structure can be modular and can reduce the upper foot print.

Additionally, in such a configuration, the bag conditioning assembly 20 includes opposing conditioners 60a, 60b that are disposed on opposing walls that are opposite that of the massage frames 40a, 40b. That is, the axis of pivoting of the opposing conditioners are positioned to be substantially perpendicular to the massage frames so that the operation of the two assemblies is substantially perpendicular to each other. It will further be understood that the massaging frames and the conditioners operate in different planes, with the massaging frames generally impacting the bottom surface of the bulk bag and the opposing conditioners impacting the sides of the bulk bag. Additionally, the opposing conditioners are mounted on or near the upper cross member of the lower structure.

The conditioner 60a will again be described with the understanding that the conditioner 60b is substantially a mirror image of the conditioner 60a. The conditioner 60a includes opposing side frames 140, upper cross beam 142, lower cross beam 144 and connector supports 146. The opposing side frames 140 are generally parallel to each other and include the pivot for the frame. The opposing side frames 140 are also substantially mirror images of each other about a midpoint bisecting the two structures. The opposing side frame 140 includes proximal end 150, distal end 152 and inward protrusion. In the configuration shown, the opposing side frame 140 includes support beam 156. The inward protrusion extends inwardly toward the bag conditioning region, so that a triangle can be formed between the position of the upper cross beam, the lower cross beam and the pivot axis. In the configuration shown, the upper cross beam is positioned at the inward protrusion to span between the two opposing side frames. A lower cross beam extends between the distal ends of the opposing side frames. The upper and lower cross beams are substantially parallel to each other and in a spaced apart configuration. The cross beams are also substantially parallel with the axis of pivoting of the conditioner 60a.

A plurality of connector supports, such as connector support 146 extend between the upper and lower cross beams (which comprise generally tubular members). The connector supports comprise a diamond-like cross-sectional configuration defining a vertex 160 (contact vertex), and opposing side wings 162, 164. The cross beams are generally positioned so as to be parallel to each other in a spaced apart configuration and positioned so as to be generally perpendicular to the upper and lower cross beams. As will be understood the connector supports are substantially oblique to a plane defined by the pivot of the conditioner and the lower cross beam.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A bulk bag discharge assembly comprising:
a main frame assembly having a first end and a second end, the main frame assembly defining a bulk bag receiving region confined thereby, which bulk bag receiving region has a lower end thereof defined by a discharge support base structurally configured to receive a bulk bag thereon for discharging; and
a bag conditioning assembly comprising opposing conditioner frames each including an impact face, each conditioner frame having a proximal end and a distal end, the proximal end being pivotably coupled to the main frame assembly, with the distal end extending downward toward the discharge support base, the impact face spaced apart from the proximal end, and powered cylinders each pivotably having a first end coupled to the main frame assembly and having a second end spaced apart from the proximal end thereof and pivotably coupled between the proximal end and the distal end of the opposing conditioner frames, respectively, the impact faces being structurally configured to impact sides of a bulk bag positioned on the discharge support base without impacting a bottom of a bulk bag, the bottom of the bulk bag being a discharge opening end of the bulk bag, wherein the distal end of the conditioner frames is directed at least partially in an upward direction, through a majority of travel within the bulk bag receiving region.

2. The bulk bag discharge assembly of claim 1 wherein each of the conditioner frames are coupled to the main frame assembly above a path of the impact face.

3. The bulk bag discharge assembly of claim 1 wherein the opposing conditioner frames are mirror images of each other.

4. The bulk bag discharge assembly of claim 1 wherein at least one of the conditioner frames further comprises:
a pair of opposing side frames positioned in a spaced apart and generally parallel configuration, each of the side frames being pivotably coupled to the main frame assembly about a proximal end thereof;
a lower cross beam extending between the pair of opposing side frames at a distal end thereof; and
an upper cross beam extending between the pair of opposing side frames between the proximal end and the distal end thereof, spaced apart from each of the proximal and distal ends thereof.

5. The bulk bag discharge assembly of claim 4 wherein the upper cross beam and the lower cross beam are parallel to each other.

6. The bulk bag discharge assembly of claim 5 wherein the upper cross beam is coupled to the pair of opposing side frames inward of a line defined by the pivotable coupling at the proximal end, and the lower cross beam at the distal end.

7. The bulk bag discharge assembly of claim 6 wherein the at least one of the conditioner frames further comprises a plurality of connector supports coupled to each of the upper cross beam and the lower cross beam in a space apart orientation between the opposing side frames.

8. The bulk bag discharge assembly of claim 7 wherein the connector supports are perpendicular to each of the upper cross beam and the lower cross beam.

9. The bulk bag discharge assembly of claim 7 wherein each of the connector supports each comprise a diamond shaped cross-sectional configuration, defining a vertex and opposing side wings extending therefrom, which form a portion of the impact face thereof.

10. The bulk bag discharge assembly of claim 1 further comprising a massaging frame assembly, the massaging frame assembly further comprising:
a pair of opposing massaging frames, each frame having a proximal end and a distal end, and defining an impact face, the opposing massaging frames being pivotably coupled to the discharge support base on opposing sides of a discharge opening, the opposing massaging frames structurally configured to direct the impact face against a bottom of a bulk bag on either side of the discharge opening.

11. The bulk bag discharge assembly of claim 10 wherein the pair of opposing massaging frames are perpendicular to the opposing conditioner frames so that a pivot axis of each of the pair of opposing massaging frames is perpendicular to the pivot axis of each of the opposing conditioner frames.

12. The bulk bag discharge assembly of claim 11 wherein the opposing massaging frames and the opposing conditioner frames impact the bag in different planes.

13. The bulk bag discharge assembly of claim 1 wherein the main frame assembly further comprises an upper structure and a lower structure, the bulk bag discharge assembly further comprising a bulk bag receiving structure being positioned in the lower structure, with the upper structure extending upwardly from the lower structure.

14. The bulk bag discharge assembly of claim 13 wherein the upper structure further includes a hoist member coupled to a beam that from the upper structure in a generally horizontal configuration.

15. The bulk bag discharge assembly of claim 14 wherein the upper structure has a foot print that is smaller than a foot print of a lower structure.

* * * * *